United States Patent [19]

Wieland

[11] Patent Number: 5,069,506
[45] Date of Patent: Dec. 3, 1991

[54] KNOCK-DOWN FURNITURE ASSEMBLY

[75] Inventor: Roy M. Wieland, Bay City, Mich.

[73] Assignee: R. M. Wieland Company, Kawkawlin, Mich.

[21] Appl. No.: 95,767

[22] Filed: Sep. 11, 1987

Related U.S. Application Data

[63] Continuation-in-part of Ser. No. 499,812, Jun. 1, 1983, abandoned.

[51] Int. Cl.$^5$ ............................................. A47C 7/00
[52] U.S. Cl. ............................................. 297/440
[58] Field of Search ................ 403/264, 297, 362; 312/257 R, 257 SK, 140; 297/440; 108/111

[56]      References Cited
       U.S. PATENT DOCUMENTS

| | | | |
|---|---|---|---|
| 838,944 | 12/1906 | Bohy . | |
| 2,053,382 | 9/1936 | Stickley | 20/92 |
| 2,463,796 | 7/1944 | O'Rourke . | |
| 2,605,820 | 8/1952 | Powellek | 155/196 |
| 2,746,769 | 2/1952 | Hoogendoorn | 280/287 |
| 2,868,604 | 1/1959 | Gibson et al. | 312/140 |
| 3,484,830 | 12/1969 | Wagner et al. | 403/297 X |
| 3,545,625 | 12/1970 | MacMillan | 403/297 X |
| 3,977,800 | 8/1976 | Cassel | 403/297 X |
| 4,116,573 | 9/1978 | Fuchs | 403/264 |
| 4,291,999 | 9/1981 | Vandelanoite | 403/297 |
| 4,411,312 | 10/1983 | English | 166/75 |

FOREIGN PATENT DOCUMENTS

| | | | |
|---|---|---|---|
| 2156497 | 5/1973 | Fed. Rep. of Germany | 403/264 |
| 2436904 | 5/1980 | France | 403/297 |

Primary Examiner—Joseph Falk
Attorney, Agent, or Firm—Baker & Daniels

[57]           ABSTRACT

A knock-down furniture assembly comprises a joint construction between furniture components wherein a rod has a slip fit engagement with a bushing. The rod is affixed to one component and the bushing to another. In one embodiment, the rod has a head which fits within a hole in a first wood component and is captured by means of cured epoxy resin introduced into the hole around an immediately adjacent portion of the rod's shank. The remainder of the rod projects from the first wood component and when the first wood component is moved into assembly with a second wood component, the rod slip fits within the bushing on the second wood component. Set screws are threaded into tapped holes in the sidewall of the bushing and are accessible through aligned holes in the second wood component for actuation by a polygonally shaped wrench engaging similarly shaped sockets in the ends of the set screws for tightening against the inserted rod shank thereby to lock the two components in assembly, and for loosening to unlock them. The disclosed embodiment is in an upholstered chair.

20 Claims, 3 Drawing Sheets

KNOCK-DOWN FURNITURE ASSEMBLY

BACKGROUND AND SUMMARY OF THE INVENTION

This application is a continuation-in-part of my United States patent application entitled KNOCK-DOWN FURNITURE ASSEMBLY, filed June 1, 1983 as Ser. No. 499,812 now abandoned.

This invention relates generally to furniture and is particularly concerned with a new and improved assembly for furniture which permits furniture components to be readily disassembled and reassembled.

Upholstered furniture is preferred for many uses, but experience shows that upholstered furniture becomes soiled and worn during use and over time presents a less than new appearance. In order to restore upholstered furniture to a fresh condition, the upholstery should be periodically cleaned. If it is extremely soiled or damaged re-upholstering or replacement may be called for. Unfortunately, cleaning of soiled upholstery and repair of damaged upholstery are often made difficult because of the construction of the furniture itself. Most upholstery is not removable for cleaning, replacement, or repair, and therefore soiled and damaged conditions are often tolerated due to that inconvenience. Soiled and damaged furniture is also sometimes tolerated where cleaning, repair, or replacement cannot be afforded or is not economically justified.

In order to prolong the useful life of an article of furniture while maintaining a fresh looking appearance, it is possible to provide a furniture construction in which the upholstery is readily removable so that it can either be cleaned and/or repaired and then reinstalled, or else be replaced by new upholstery.

Applicant has developed articles of furniture which can be kept fresh looking for an extended period of time because of the conveniently removable nature of its upholstery. Yet these articles of furniture are sturdy, rugged, and are not readily susceptible to unauthorized tampering, even though they permit convenient removal and reinstallation of upholstery.

One of the problems associated with providing removable and reinstallable upholstery is that the furniture itself often must be disassembled. Knock-down articles of furniture are of course well known. Many of the knock-down systems, however, are unsatisfactory for any of a number of different reasons. For example, the joints may be too difficult to disassemble and reassemble, or they may not be sturdy enough for long term usage or to withstand repeated disassembly and reassembly. Also, known joints used in knock-down systems cannot adjust for varying cushion foam and fabric thicknesses. Other problems are that the joints may be too readily disassembled, may too easily become loose, or may present an invitation to unauthorized disassembly and subsequent theft.

The present invention is directed to a new and improved knock-down furniture assembly relating in particular to a joint for joining separable components of a piece of furniture. The invention overcomes the foregoing disadvantages in that it comprises a joint which, although substantially concealed from view to discourage unauthorized tampering, is yet surprisingly readily operable by authorized individuals to permit convenient disassembly and reassembly. Moreover, the construction of the joint is such that the assembled components can remain sturdily joined over a course of use even though being disassembled and reassembled a number of times. A still further attribute of the invention is that it comprises relatively few and uncomplicated component parts and is therefore of economical construction.

The invention allows the furniture to be disassembled and reassembled for maintenance, yet is strong and secure. Fabric covers can be removed for cleaning and/or repair and reinstallation, or alternatively replacement, even by untrained maintenance personnel. Fastening is strong, stronger than glued and dowelled joints, screwed joints, corner-blocks, or other knock-down fasteners, such as post-and-slot knock-down clips. The invention can be made highly tamper-resistant since fasteners are hidden from sight, or recessed within wood, and subsequently covered, by other parts of the furniture (seat and back cushions, front rails, etc.) It is esthetically pleasing in that no fasteners are exposed to view.

In the disclosed preferred embodiment contained in the present patent application, the article of furniture is a chair in which the sides are removable from the seat and back, joints embodying principles of the invention being provided between the sides and the seat and back. Each joint comprises axially mutually slip fitting elements, one of which is affixed to a seat and back section and the other of which is affixed to a side section. The slip fit direction is in the same direction as the sections separate.

The element of each joint which is affixed to the seat and back section comprises a tubular bushing. The bushing fits within a bore in a part of the framework of the seat and back section. Each bushing is provided with a pair of threaded holes in its sidewall which are spaced axially apart. These threaded holes align with corresponding holes provided in the framework member within which the bushing is disposed. Set screws are threadedly engaged with the threaded holes, and are accessible for operation via the aligned holes in the framework member.

The remainder of each joint comprises a rod which is affixed to the framework of the corresponding side section. Each rod comprises a shank which has a slip fit engagement with the corresponding tubular bushing, and it also has a head which fits into a hole in the framework of the corresponding side section. Each rod is secured in place by a cured epoxy resin which fills the corresponding hole to capture the head within the hole.

In the assembled chair, the rods on each side section slip fit via their shanks into corresponding bushings in the seat and back section. The extent to which the rods penetrate the bushing is affected by the thickness of the fabric and foam of the cushion, it being anticipated that the density of the foam might vary over time, thereby requiring different degrees of penetration. The set screws are operated by suitable tools to bear against the sides of the slip fitted shanks thereby locking the two sections together. The set screws are recessed within their access holes and therefore are not exposed to view. The joints are also disposed in location which are hidden from view so as not to be apparent to an observer. They are however readily accessible to an authorized individual knowledgeable in the construction of the chair.

The sections are separated by unthreading the set screws to release them from their forceful abutment with the shanks of the rods. When all set screws have been released, the side sections can be separated with the rods slipping out of the bushings. This allows the chair to be disassembled for transport, storage, and/or maintenance purposes and also provides access to removable upholstery on the respective sections so that the upholstery can be removed for cleaning, repair, and/or replacement. Subsequently, upholstery is reinstalled, and the sections can be reassembled in the reverse manner from their disassembly.

The invention, in accordance with another embodiment thereof, provides a joint for attaching a first component of an article of furniture to a second component thereof. The joint comprises an elongated tubular member having an end opening and a sidewall and being mounted at one end to the first component. The joint further comprises an elongated bar member, mounted at one end to the second component, being adapted to axially slip fit into the tubular member through the end opening. Means are provided for locking the bar member within the tubular member when the bar member and the tubular member are operatively assembled. The locking means comprises a set screw threadedly engaged with a transverse threaded bore in the bar member, and an access opening in the sidewall in the tubular member. The access opening is located to align with the threaded bore and provide access to the set screw when the bar member is slip fit into the tubular member. The set screw is selectively operable to bear against the sidewall of the tubular member.

A further aspect of the present invention is the provision of means for attaching a cushion of an article of furniture to a frame member thereof. Typically, furniture cushions are either independent of the article of furniture they accompany, or they are integrally secured thereto. A problem arises in either case in that the cushions may become lost, stolen, or otherwise separated from the article of furniture, or they are so permanently a part of the furniture that cleaning, reupholstering, replacement, and removal is very difficult, if not impossible. It is desired to provide a means for attaching cushions to furniture frame members whereby the cushion is positively attached to the furniture so as to provide easy access therearound for cleaning, yet is easily detached for replacement or repair. Accordingly, the present invention, in one aspect thereof, provides means for easy attachment of a cushion to the frame of an article of furniture, wherein cooperatively fitting members are located on each of the cushion and the furniture frame.

More specifically, a cushion assembly comprising a foam body member having an upholstered cover is provided with an elongated tubular member attached thereto. One end of the elongated tubular member having anchoring means is disposed within a slit in the foam body and is positively retained therein as the slit is bonded closed. The end of the tubular member extending from the cushion assembly includes an open end and a sidewall having an access opening therethrough. An elongated bar member is mounted at one of its ends to a frame member of the article of furniture. The elongated bar member is adapted to axially slip fit into the open end of the tubular member and is retained therein by locking means associated with the elongated bar member. The locking means comprises a set screw threadedly engaged with a transverse threaded bore in the bar member. When the cushion assembly is operatively attached to the furniture frame member, the access opening in the tubular member is aligned with the threaded bore in the bar member to provide access to the set screw. The set screw is selectively operable to bear against the sidewall of the tubular member to attach the cushion assembly to the furniture frame member.

There are several advantages to the aspect of the present invention whereby a cushion assembly is attached to a frame member of an article of furniture. The cushion assembly will not become lost, stolen, or otherwise separated from the article of furniture. Also, by the method of attachment claimed and described herein, the cushion assembly may be manipulated about the point of attachment to provide access therearound for cleaning and the like. Furthermore, a cushion having attachment means according to the present invention may be easily removed for cleaning, repair, or replacement. In the case of replacement, individual components of the cushion assembly may be more easily replaced.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
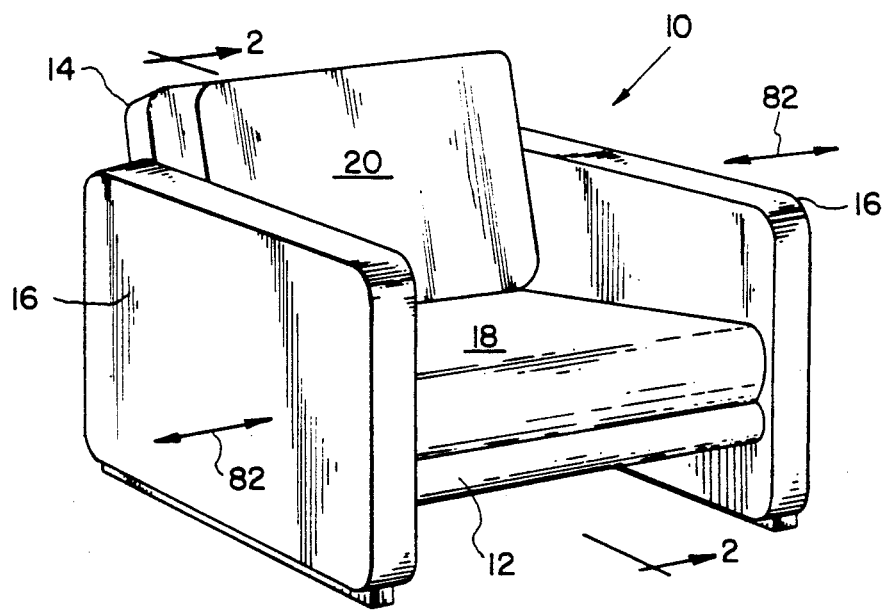
FIG. 1 is a perspective view of an article of furniture embodying principles of the invention, the preferred disclosed embodiment being of a chair.

FIG. 1 illustrates an upholstered chair 10 embodying principles of the present invention. The chair comprises a seat 12, a back 14, and two sides 16. Cushions 18 and 20 are disposed on the seat and back respectively. The particular construction of chair 10 comprises the two sides 16 being separably joined with the seat and back.

Figure 2:
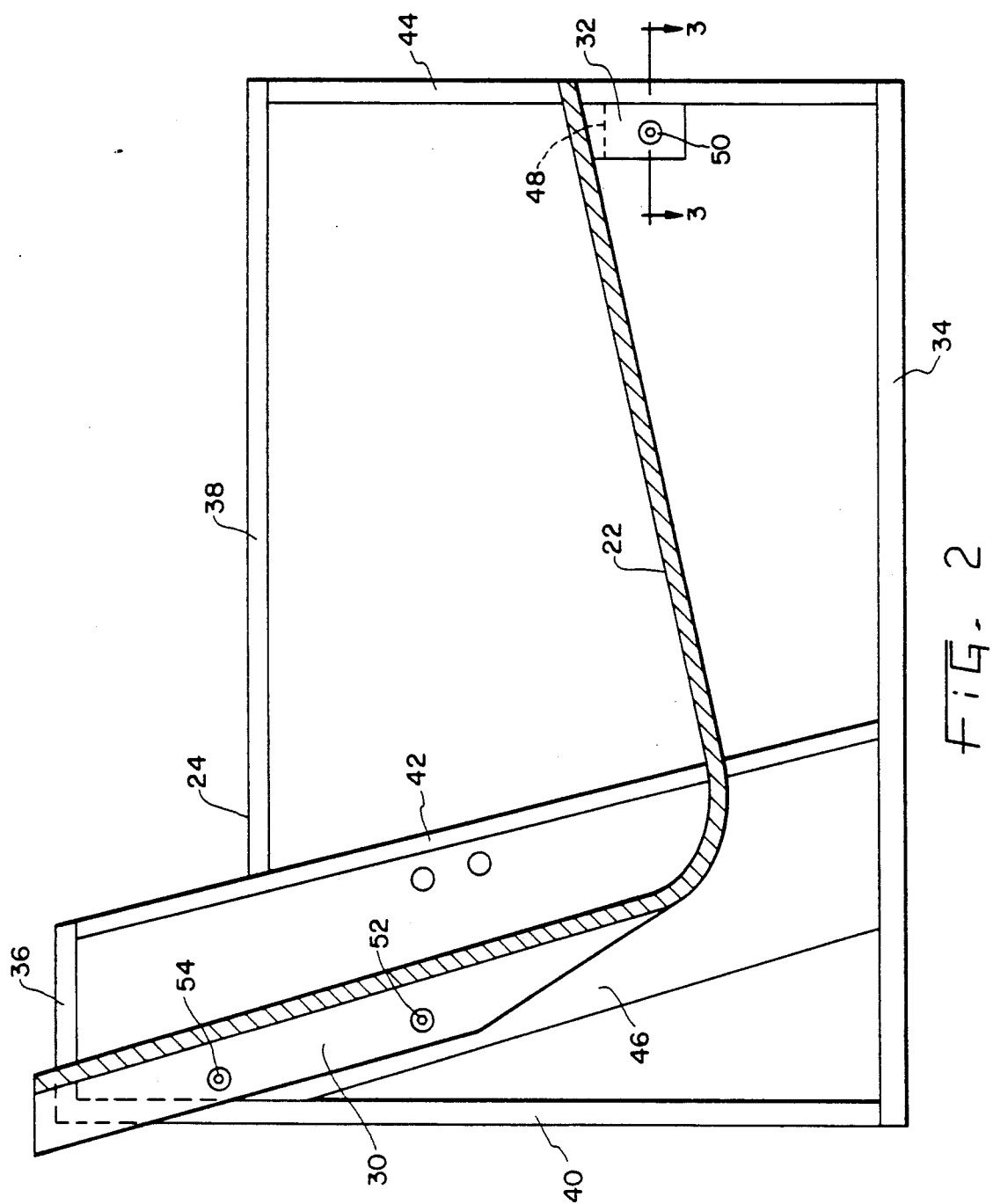
FIG. 2 is a central vertical cross sectional view looking laterally and taken substantially in the direction of arrows 2—2 in FIG. 1 on an enlarged scale but with portions removed.

FIG. 2 illustrates certain details of the internal framework construction which provides this capability. The framework is shown to comprise a contoured seat and back section 22 and a side section 24, the side section 24 which appears in FIG. 2 being the left hand side for an occupant of the chair. The right hand side section is symmetrically opposite to the left hand one. Affixed to the contoured seat and back piece along each lateral side of the back are mounting boards 30. Also affixed to the contoured seat and back section 22 along lateral sides adjacent the forward edge of the seat are mounting blocks 32 which mount to the underside of the seat.

Each side section is constructed of six members 34, 36, 38, 40, 42, and 44 suitably joined. A brace board 46 is also affixed to the side section to laterally confront mounting board 30. A front mounting block 48 is affixed to member 44 to laterally confront mounting block 32 of the seat and back section. These sections are typically constructed of wood or other suitable material.

Three joints are provided via which each side section 24 separably joins with the corresponding side of the seat and back section 22. In FIG. 2 the three joints by which the left hand side section joins with the seat and back section are identified by the reference numerals 50, 52, and 54. As can be seen, the joint 50 is provided at the front mounting blocks 32 and 48 while the remaining two joints are provided at mounting board 30 and brace board 46.

Figure 3:
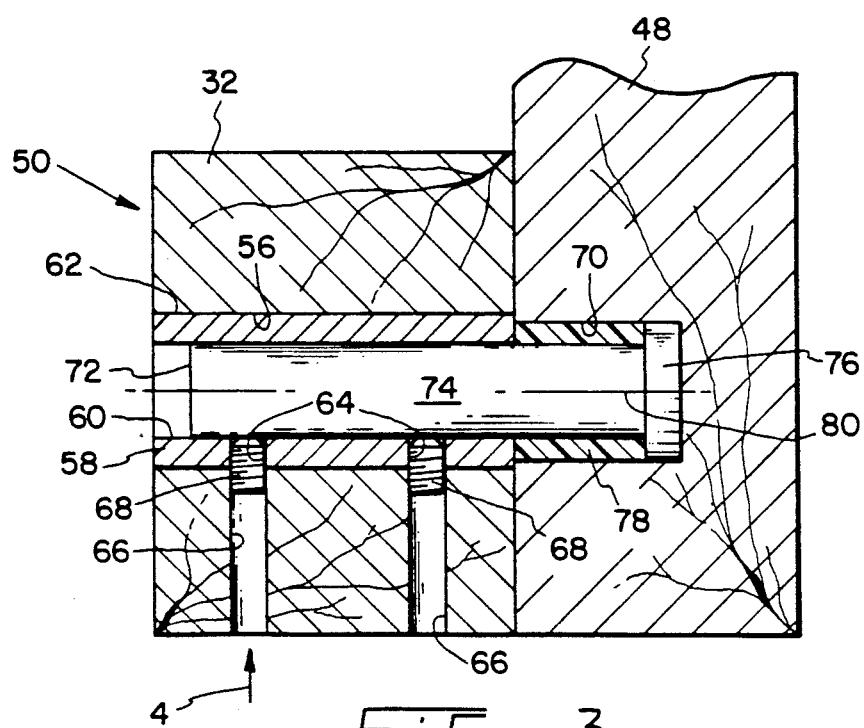
FIG. 3 is a vertical cross sectional view taken substantially in the direction of arrows 3—3 in FIG. 2 and enlarged.

FIG. 3 illustrates details of joint 50, and the construction of the other joints is similar. Joint 50 is provided in part by a laterally extending circular hole, or bore, 56 which extends completely through mounting block 32. A metal bushing 58 is disposed within hole 56 and is affixed to the mounting block by any suitable means. The length of the bushing is preferably such that its axial ends are flush with the opposite lateral faces of block 32. The bushing is of a circular shape having a circular inside diameter (I.D.) 60 and a circular outside diameter (O.D.) 62. A suitable I.D. is one half inch.

The bushing is further provided with a pair of threaded holes 64 through its sidewall. The axis of each hole is on a radial to the axis of the bushing, and the two threaded holes are axially spaced apart and in circumferential alignment about the axis of the bushing.

Block 32 is provided with a pair of holes 66 which respectively align with threaded holes 64 so as to form continuations of the threaded holes. Holes 66 extend from the lower exterior face of mounting block 32 to intercept hole 56. Threaded fasteners in the form of set screws 68 are disposed each within a corresponding one of the threaded holes 64 and the corresponding aligned continuation hole 66. The set screws are threadedly engaged with holes 64.

The remainder of the joint is provided in part by a hole 70 in the laterally inwardly facing surface of mounting block 48 coaxial with hole 56 in the confronting mounting block 32. A metal rod 72 is securely affixed to mounting block 48. Rod 72 comprises a circular cylindrical shank 74 and a circular cylindrical head 76. The diameter of head 76 allows it to fit closely within hole 70, and the axial dimension of head 76 is made less than the length of hole 70 so as to permit an immediately adjacent portion of the shank to be disposed within hole 70. In the illustrated construction, head 76 is fully disposed within the hole so that the end of the head abuts the bottom of the hole. This leaves a residual annular volume surrounding the immediately adjacent portion of shank 74 within hole 70 to receive a filler 78 for securing the rod on mounting block 48. The preferred material for this filler is an epoxy resin which is applied to fill this annular volume after the rod has been fully inserted into the hole and which is thereafter allowed to cure. The cured epoxy resin forms a bond between the mounting block and rod. It serves to securely retain the head of the rod in place while still allowing the two mounting blocks 32, 48 to be brought into confronting abutment with each other in the assembled piece of furniture.

The joint thus comprises a longitudinal axis 80 which is coaxial with rod 72 and bushing 58. This axis 80 extends laterally of the chair so as to align with the direction of the arrows 82 via which the sides 16 of the chair 10 are assembled to and disassembled from the seat and back section 22.

Figure 4:
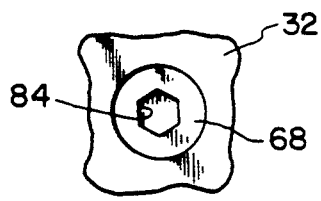
FIG. 4 is a view looking in the direction of arrow 4 in FIG. 3 and enlarged.

The I.D. 60 of bushing 58 and the O.D. of shank 74 of rod 72 are such that they provide a close fitting axial slip fit. With both set screws 68 of joint 50 positioned such that they are clear of the I.D. 60, joint 50 does not prevent the side from being displaced axially toward and away from the seat and back. With side 16 disposed against the seat and back section to abut blocks 32 and 48, as illustrated in FIG. 3, set screws 68 can be rotated to advance them in the radially inward direction relative to axis 80. The tips of the set screws forcefully abut the side of shank 74 and may be tightened to exert a locking force between the rod 72 and bushing 58 which prevents the rod from being slipped out of the bushing. It will be observed in FIG. 4 that the set screws are provided with polygonally shaped sockets 84 in their radially outer ends. The sockets are intended to be actuated by a tool (not shown) of similar non-circular cross section. For example, the illustrated construction is a hexagonal socket suitable for use by a similarly sized hexagonal wrench. The wrench is inserted via the open end of each bore 66 to engage with the socket of the corresponding set screw 68. The untightening of the set screws 68 is effective to disengage them from their forceful engagement with the rod 72, once again allowing the rod 72 to slip out of the bushing 58. For removing a side 16, the set screws 68 of all joints along that side are loosened allowing the side 16 to be removed. The set screws 68 are loosened just enough so that they remain threaded with holes 64. The side 16 is reassembled in the opposite manner.

The unfastening procedure may be used whenever the need arises to remove a side or sides 16 from the seat and back 22. This is important in that it allows the upholstery to be removed for cleaning and/or replacing, and yet the joint construction remains sturdy and secure even though repeated disassembly and reassembly may take place over the lifetime of the furniture. Similarly, the furniture can be disassembled for transport or storage purposes if desired.

A further advantage of the invention is that it is substantially tamper resistant. The joints themselves are generally concealed within the assembled article of furniture. If one were to attempt to locate disassembly points, all one would see would be the openings of the holes 66. Because the set screws are relatively small in length in comparison to the length of the holes 66, the set screws are located deep within the holes 66 and are apparent, if at all, only upon a very detailed investigation. Even then it will be difficult to determine the exact nature of what is contained within the bores due to the small diameters. This coupled with the fact that a tool such as a polygonally shaped wrench as required, will discourage unauthorized tampering. However, a person having knowledge of the construction will be readily able to disassemble and reassemble a piece of furniture.

The application of the invention to the illustrated chair is advantageous in that the sides may be constructed in the manner illustrated. In other words, because the bushings and set screws are on the seat and back section, no access is needed through the side sections to lock and unlock the joints.

The superior attributes resulting from the invention enable the offering of extended warranty periods for manufactured furniture embodying the invention. In addition to its sturdiness, the joint is vibration and humidity resistant. It is not plagued by swelling or shrinking which is characteristic of many other types of furniture joints. Although shown with a chair, in this application, the invention may be used in other furniture pieces where joining of wood pieces is required.

Figure 5:
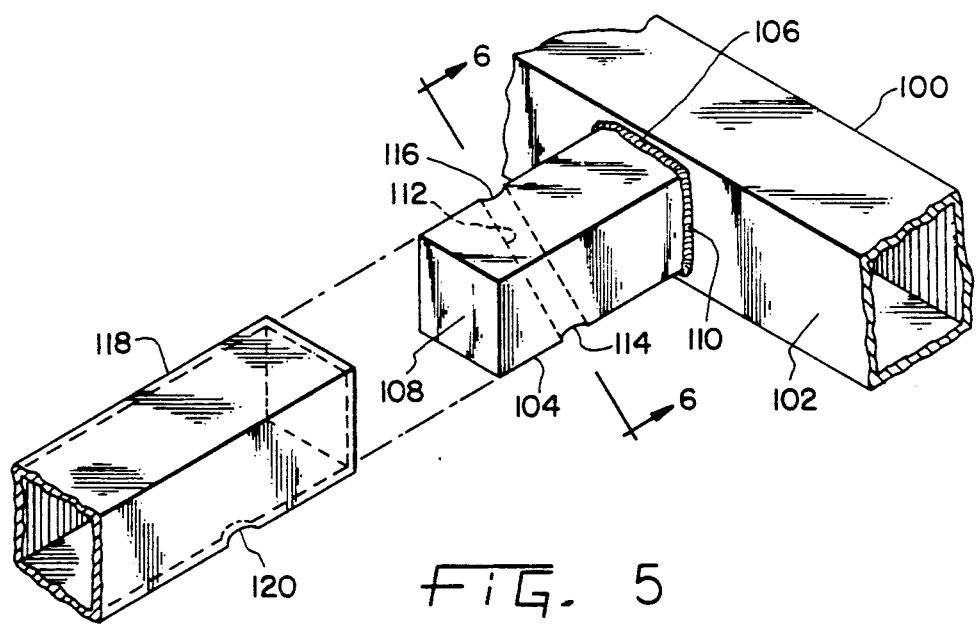
FIG. 5 is a fragmentary exploded perspective view of a furniture joint according to an alternative embodiment of the present invention.
Figure 6:
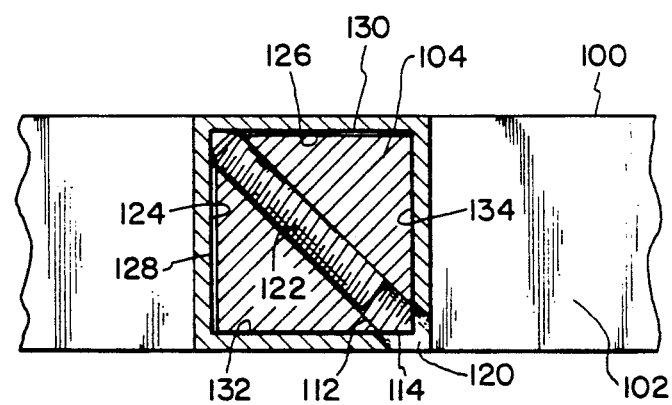
FIG. 6 is an enlarged fragmentary sectional view of the furniture joint of FIG. 5 taken along the line 6—6 in FIG. 5 and viewed in the direction of the arrows.

Referring now to FIGS. 5 and 6, there is shown an alternative embodiment of a joint for attaching components of an article of furniture according to the present invention. FIG. 5 illustrates a joint for an article of furniture having a frame member, such as square tubing 100. Square tubing 100 has a mounting side 102 to which an elongated tubular member, such as square bar 104, is mounted perpendicularly to the plane of mounting side 102. Square bar 104 includes a mounting end 106 and a protruding end 108. Mounting end 106 is attached to mounting side 102 of tubing 100 by a weld 110, or by some other suitable method of attachment. It is also contemplated that the frame member to which square bar 104 is attached may be of wood, and that square bar 104 would be epoxied thereto.

A threaded hole 112, having a head opening 114 and a bottom opening 116, extends through bar 104 transversely to the longitudinal axis thereof. In the embodiment illustrated in FIG. 5, threaded hole 112 extends diagonally through square bar 104 between axially extending edges thereof.

Protruding end 108 of square bar 104 is adapted for insertion into an elongated tubular member, such as square tube 118. Square tube 118 may be mounted to a component of an article of furniture or may itself comprise a component such as a tubular frame member. Square tube 118 and square bar 104 are adapted to axially slip fit together as shown in FIG. 5. When square tube 118 is axially slip fit over square bar 104 in its operative position, an access opening 120 in square tube 118 aligns with head opening 114 of threaded hole 112. Access opening 120 may be axially extended to allow access to head opening 114 over a small range of axial positions of square tube 118 and square bar 104 relative to one another.

FIG. 6. illustrates square bar 104 and square tube 118 in slip fit arrangement with one another, and, more particularly illustrates locking means for locking square bar 104 within square tube 118. Specifically, a set screw 122 is threadedly engaged in threaded hole 112 and is selectively operably by insertion of a tool through access opening 120 and head opening 114 to be adjusted to bear against a first pair of adjacent sides 124 and 126 of square tube 118. As illustrated in FIG. 6, when set screw 122 is adjusted to bear against sides 124 and 126 of tube 118, respective spaces 128 and 130 are created between square bar 104 and square tube 118. At the same time, square bar 104 is caused to bear against a second pair of adjacent sides 132 and 134 of square tube 118. In this way, relative axial and rotational movement between square bar 104 and square tube 118 is prevented. Use of square tubing and bar components is preferred due to the relatively high resistance of this type of joint to rotational forces. However, round tubing and bar components may also be used to practice the invention, as desired.

Figure 7:
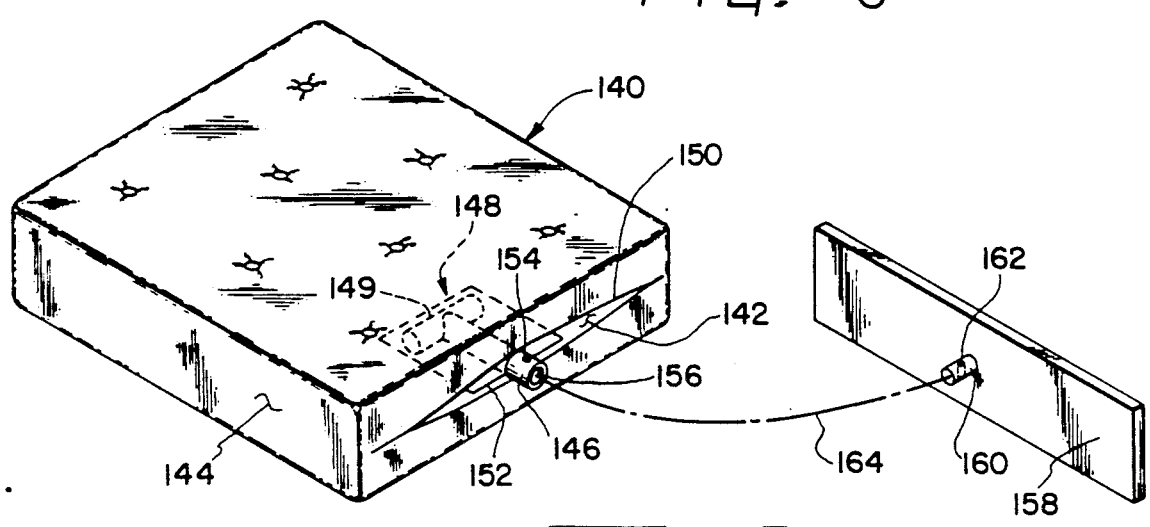
FIG. 7 is an exploded perspective view of an apparatus for removeably mounting a cushion member to a frame member of an article of furniture, according to an alternative embodiment of the present invention.

Referring now to FIG. 7 for yet a further embodiment of the present invention, there is shown a cushion assembly 140 comprising a foam body 142 and an upholstery covering 144. A bushing 146 is mounted to cushion assembly 140 in a manner such that a portion of bushing 146 is disposed within foam body 142. At the end of bushing 146 disposed within foam body 142, there is included anchoring means 148, such as an elongated crossbar member 149 welded to the end of bushing 146.

Bushing 146 and crossbar 149 are inserted within foam body 142 by providing an opening 150 in upholstery covering 144. Opening 150 provides access to foam body 142, in which a slit 152 is made that extends into the interior of foam body 142. Once bushing 146 is inserted therein, slit 152 is closed and bonded to retain bushing 146, having anchoring means 148, within foam body 142. Slit 152 may be bonded shut with glue or any other suitable bonding material for use with the foam material comprising foam body 142.

Analogous to the joint structure described in conjunction with FIGS. 5 and 6, bushing 146 includes an access opening 154 and an inside wall surface 156. Consequently, cushion assembly 140 is adapted to be attached to a frame member 158 of an article of furniture. Frame member 158 includes an elongated bar member, such as solid rod 160, attached thereto by a suitable means disclosed herein for either a wooden or metal frame member 158. Solid rod 160 includes a threaded hole 162 extending transversely to the longitudinal axis of solid rod 160. As indicated by line 164, cushion assembly 140 is assembled to frame member 158 and may be secured thereto by locking means consisting of a set screw in threaded hole 162 accessible through access opening 154 and adjustable the bear against inside wall surface 156. It is appreciated that when cushion assembly 140 is attached to frame member 158 by the illustrated joint structure at one location, the remainder of cushion assembly 140 may be manipulated, such as by lifting, in order to clean beneath the cushion, gain access there beneath, etc.

While a single method of retaining bushing 146 within foam body 142 has been disclosed, it is understood that alternative methods exist. For example, bushing 146 may be epoxy set into a block that is attached to the bottom of a plywood substrate within foam body 142. Alternatively, bushing 146 may be bolted to a piece of hardwood that is embedded and glued within foam body 142. Still further, bushing 146 may be mounted to the frame member 158 and rod 160 may be mounted to the cushion assembly 140.

It will be appreciated that the foregoing description of a preferred embodiment of the invention, together with alternative embodiments thereof, is presented by way of illustration only (and not by way of any limitation) and that various alternatives and modifications may be made to the illustrated embodiments without departing from the spirit and scope of the invention.

What is claimed is:

1. In an article of furniture having selected components which are adapted to be disassembled and reassembled in a given direction, a joint providing for such disassembly and reassembly between said selected components comprising two axially mutually separable slip fitting elements, one said elements being affixed to one of said selected components and another said element being affixed to another of said selected components, said elements being arranged with their axial slip fit in the same direction as said selected components are adapted to be disassembled, and means for releasably locking said elements when they are mutually slip fitted, said locking means comprising set screw means threadably engaged with a transverse threaded bore of said one element and selectively operable transversely of the direction of slip fit to one position for transversely directly contacting and forcefully bearing against said another element and forcing said another element against said one element thereby to lock said elements against axial separation and to another position permitting said elements to axially separate, one of said selected components having a bore aligned with and forming a continuation of said transverse threaded bore of said one element, said set screw means extending into the end of said continuation bore adjacent said one element and being non-protruding from the opposite end of said continuation bore of said one selected component when said set screw transversely forcefully contacts said another element.

2. In an article of furniture having selected components that are disassemblable and reassemblable in a given direction, a joint providing such disassembly and reassembly between respective confronting surfaces of said selected components, said joint comprising two axially mutually separable slip fitting elements, a first said element being affixed to one of said selected components and comprising a hollow tubular sidewall extending from one of said components and perpendicularly to the confronting surface thereof, a second said element being affixed to another of said selected components and comprising a shank, said elements being arranged with said first and second elements axially longitudinally aligned and with the direction of their axial slip fit being the same as the given direction of assembly of said selected components, and means for releasably locking said elements when they are mutually slip fitted comprising means engaged with one of said elements and selectively operable transversely of the direction of slip fit to one position for directly contacting and forcefully bearing against the other said element and forcing said other element against said one element thereby to lock said elements against axial separation and to another position permitting said elements to axially separate.

3. A joint as set forth in claim 2 in which said shank includes a head at one end of said shank, said another selected component having a hole within which said head is disposed, and means to capture said head within said hole.

4. A joint as set forth in claim 3 in which said head and an immediately adjacent part of said shank are both disposed within said hole, and said means to capture said head within said hole comprises filler in said hole around said immediately adjacent part of said shank filling said hole and joining with said another selected component to thereby capture said head.

5. A joint as set forth in claim 4 in which said filler comprises a cured epoxy resin.

6. A joint as set forth in claim 3 in which said tubular sidewall has a cylindrical tubular shape, said shank has a cylindrical rod shape, and said hole has a cylindrical shape.

7. A joint as set forth in claim 6 in which said selected components are mutually abuttable at confronting surfaces, and the outside diameter of said tubular sidewall is greater than the outside diameter of said hole and said tubular sidewall and hole are coaxially aligned such that the outside marginal perimeter at one end of said tubular sidewall abuts a corresponding marginal perimeter portion of said another selected component around said hole when said selected components are mutually abutted.

8. A joint as set forth in claim 2 in which said means selectively operable transversely of the direction of slip fit comprises a threaded element which is threadedly engaged with a transverse threaded bore extending through said tubular sidewall, said threaded element being selectively transversely operable by rotation about the axis of said threaded bore to forcefully bear against the shank of said another element to lock said slip fitting elements against axial separation.

9. A joint as set forth in claim 8 in which said threaded element comprises a set screw having a polygonal socket via which said set screw is selectively transversely operable, said one selected component having a bore aligned with and forming a continuation of said transverse threaded bore, said set screw being non-protruding from said continuation bore of said one selected component when transversely forcefully bearing against the shank of said another element.

10. A joint as set forth in claim 2 in which the article of furniture is a chair having a seat and back section and side section, said side section and said seat and back section being disassemblable and reassemblable in a given direction, and said joint is provided between said side section and said seat and back section.

11. A joint for attaching a first component of an article of furniture to a second component thereof, comprising:
an elongated tubular member, mounted at one end to said first component, said tubular member having an end opening, a sidewall, and an access opening in said sidewall;
an elongated bar member, mounted at one end to said second component and being adapted to axially slip fit into said tubular member through said end opening, said bar member including a transverse threaded bore; and
means for locking said bar member within said tubular member when said bar member and said tubular member are operatively assembled, said locking means comprising a set screw threadedly engaged with said transverse threaded bore, said access opening being located to align with said threaded bore and provide access to said set screw when said bar member is slip fit into said tubular member, said set screw being selectively operable to directly contact and bear against said sidewall of said tubular member.

12. The joint of claim 11 in which said tubular member is a square tube and said bar member is a square bar.

13. The joint of claim 12 in which said transverse threaded bore extends between opposite axially extending edges of said bar member.

14. The joint of claim 11 in which said second component and said square tube are composed of metal and said square tube is mounted to said second component by welding.

15. The joint of claim 14 in which said first component is a section of square tubing, the end of which comprises said elongated tubular member.

16. The joint of claim 11 in which one of said first and second components is a cushion member and the other of said first and second components is a frame member.

17. The joint of claim 16 in which said cushion member includes a foam body having a slit therein, the mounting end of one of said tubular member and said bar member being disposed within said slit for mounting said cushion member, said slit being bonded closed to retain said one of said tubular member and said bar member therein.

18. The joint of claim 17 in which said mounting end of said one of said tubular member and said bar member disposed within said slit includes means for anchoring comprising a crossbar member.

19. The joint of claim 16 in which said tubular member is a cylindrical tube and said bar member is a cylindrical bar.

20. The joint of claim 19 in which said cushion member includes a foam body having a slit therein, the mounting end of the one of said tubular member and said bar member being disposed within said slit for mounting said cushion member and including means for anchoring comprising a crossbar member, said slit being bonded closed to retain said one of said tubular member and said bar member therein.

* * * * *